United States Patent
Sasao

(10) Patent No.: US 10,850,691 B2
(45) Date of Patent: Dec. 1, 2020

(54) MANAGEMENT DEVICE AND POWER SUPPLY SYSTEM

(71) Applicant: SANYO Electric Co., Ltd., Daito (JP)

(72) Inventor: Hideyuki Sasao, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 27 days.

(21) Appl. No.: 16/327,059

(22) PCT Filed: May 9, 2017

(86) PCT No.: PCT/JP2017/017454
§ 371 (c)(1),
(2) Date: Feb. 21, 2019

(87) PCT Pub. No.: WO2018/042765
PCT Pub. Date: Mar. 8, 2018

(65) Prior Publication Data
US 2019/0202384 A1    Jul. 4, 2019

(30) Foreign Application Priority Data

Aug. 30, 2016  (JP) ................................ 2016-168512

(51) Int. Cl.
*B60R 16/033*   (2006.01)
*H02J 7/00*     (2006.01)
(Continued)

(52) U.S. Cl.
CPC ....... *B60R 16/033* (2013.01); *H01M 10/0525* (2013.01); *H01M 10/06* (2013.01);
(Continued)

(58) Field of Classification Search
CPC ... B60R 16/033; H02J 9/06; H02J 7/34; H02J 7/1423; H02J 7/00; H02J 9/061;
(Continued)

(56) References Cited

U.S. PATENT DOCUMENTS 6,046,512 A * 4/2000 Heise ...................... H02J 9/061
307/10.1
6,462,926 B1 * 10/2002 Zaretsky ............... H02J 7/0047
361/103
(Continued)

FOREIGN PATENT DOCUMENTS

JP   2000-504551 A   4/2000
JP   2008-220039 A   9/2008
(Continued)

OTHER PUBLICATIONS

International Search Report dated Jun. 6, 2017, issued in counterpart International Application No. PCT/JP2017/017454 (2 pages).

*Primary Examiner* — Jared Fureman
*Assistant Examiner* — Michael J Warmflash
(74) *Attorney, Agent, or Firm* — Westerman, Hattori, Daniels & Adrian, LLP

(57) ABSTRACT

A management device manages a second power storage device that reinforces a first power storage device for supplying electricity to loads in the vehicle. A power supply unit of the management device steps down a voltage supplied from the first power storage device. A control unit uses, as a power supply voltage, the voltage generated by the power supply unit and monitors the state of the second power storage device to control the charging and discharging of the second power storage device. A switch electrically connects or disconnects the second power storage device to or from the power supply unit. The switch is turned on when an ignition is in an on-state, and is turned off when the ignition is in an off-state.

4 Claims, 3 Drawing Sheets

(51) Int. Cl.
  *H01M 10/0525* (2010.01)
  *H01M 10/06* (2006.01)
  *H01M 10/34* (2006.01)
  *H01M 10/44* (2006.01)
  *H01M 10/48* (2006.01)
  *H02J 7/14* (2006.01)
  *H02J 7/34* (2006.01)
  *H02J 9/06* (2006.01)

(52) U.S. Cl.
  CPC ......... *H01M 10/345* (2013.01); *H01M 10/44* (2013.01); *H01M 10/48* (2013.01); *H02J 7/00* (2013.01); *H02J 7/0068* (2013.01); *H02J 7/1423* (2013.01); *H02J 7/34* (2013.01); *H02J 9/06* (2013.01); *H02J 9/061* (2013.01); *H01M 2220/20* (2013.01)

(58) Field of Classification Search
  CPC .... H02J 7/0068; H02J 2310/46; H01M 10/48; H01M 10/44; H01M 10/345; H01M 10/06; H01M 10/0525; H01M 2220/20; H01M 10/425; H01M 2010/4271; H01M 16/00
  See application file for complete search history.

(56) References Cited

U.S. PATENT DOCUMENTS

| | | | |
|---|---|---|---|
| 2015/0239411 A1* | 8/2015 | Nakajima | F02N 11/0866 307/10.6 |
| 2016/0009194 A1* | 1/2016 | Katayama | B60L 58/15 320/109 |
| 2016/0185240 A1 | 6/2016 | Horitake et al. | |

FOREIGN PATENT DOCUMENTS

| | | |
|---|---|---|
| JP | 2016-28543 A | 2/2016 |
| JP | 2016-123212 A | 7/2016 |
| WO | 2008/053808 A1 | 5/2008 |

\* cited by examiner

FIG. 3

| Ignition input signal | Voltage of lead storage battery 2 | Switch SW2 |
|---|---|---|
| ON | Normal | ON |
| ON | Under lower limit voltage | ON |
| OFF | Normal | OFF |
| OFF | Under lower limit voltage | ON |

MANAGEMENT DEVICE AND POWER SUPPLY SYSTEM

TECHNICAL FIELD

The present invention relates to a management device and a power supply system, for managing a power storage device.

BACKGROUND ART

At present, a lead storage battery is incorporated in many vehicles. Power from this lead storage battery is supplied to many kinds of electric equipment or a starter motor. This lead storage battery is inexpensive, but has the characteristics of a short cycle life, compared with a nickel hydride storage battery or a lithium ion storage battery. In a vehicle having the idle stop function, as the number of charging and discharging is increased, the life of the lead storage battery is especially shortened. Recently, the number and the power consumption of the electric equipment incorporated in the vehicle are increased.

Then, the following method or structure has been proposed. The other power storage device (for example, a nickel hydride storage battery, a lithium ion storage battery, or an electric double layer capacitor) is connected in parallel with the existing lead storage battery. (refer to, for example, Patent Literature 1, 2)

CITATION LIST

Patent Literature

Patent Literature 1: Unexamined Japanese Patent Publication No. 2016-28543
Patent Literature 2: Unexamined Japanese Patent Publication No. 2016-123212

SUMMARY OF THE INVENTION

Conventionally, a control circuit board manages a state of newly incorporated power storage device and controls charging or discharging of this power storage device. The power supply to the control circuit board is made from the lead storage battery. Therefore, when the lead storage battery becomes unusable, even though a capacity of the power storage device remains, the power supply cannot be made from the power storage device to the electric equipment.

The present disclosure is developed for solving such requirements. It is an object of the present disclosure to provide a technology in which a power storage device reinforced in a vehicle is effectively used.

To solve the above-mentioned requirements, a management device for managing a second power storage device that reinforces a first power storage device for supplying electricity to loads in a vehicle, of one aspect of the present invention, includes: a power supply unit that steps down a voltage supplied from the first power storage device; a control unit that uses, as a power supply voltage, the voltage generated by the power supply unit and monitors a state of the second power storage device to control charging and discharging of the second power storage device; and a switch that electrically connects or disconnects the second power storage device to or from the power supply unit.

Any desired combinations of the above-described components and converted expressions of the present invention in methods, devices, systems, and other similar entities are still effective as aspects of the present invention.

According to the present invention, a power stooge device reinforced in a vehicle can be effectively used.

BRIEF DESCRIPTION OF DRAWINGS

FIG. 3 is a view showing the on/off states of a second switch.

DESCRIPTION OF EMBODIMENTS

Figure 1:
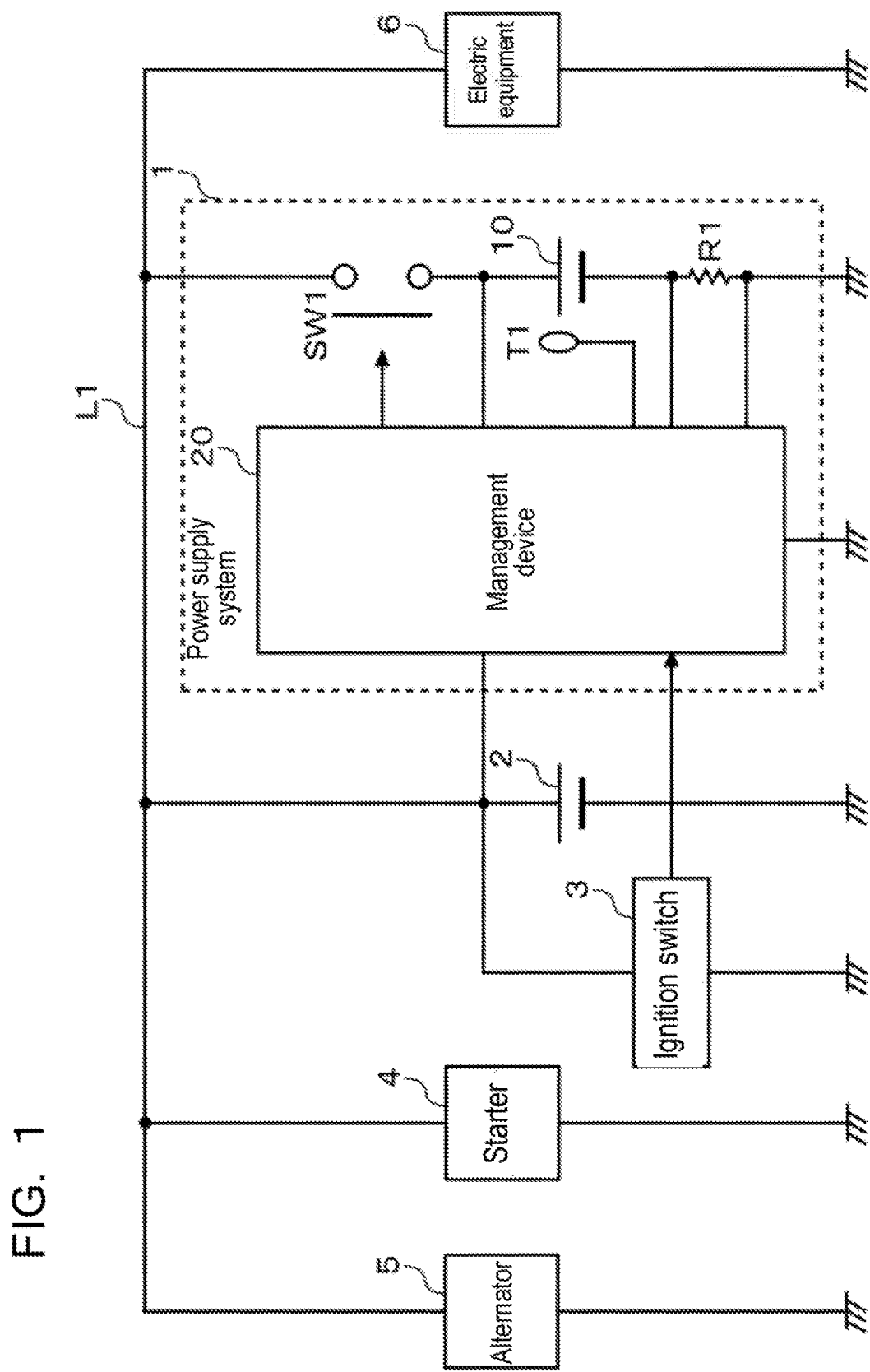
FIG. 1 is a diagram for describing a power supply system according to an exemplary embodiment of the present invention.

FIG. 1 is a diagram for describing power supply system 1 according to an exemplary embodiment of the present invention. Power supply system 1 is a sub-battery system which reinforces lead storage battery 2. In the vehicle which incorporates lead storage battery 2 and power supply system 1, ignition switch 3, starter 4, alternator 5, and electric equipment 6 as related members to those, are installed.

Ignition switch 3 is a switch for starting an engine. Starter 4 is a motor for starting the engine. Starter 4 is rotated with power supplied from lead storage battery 2, to start the engine. When ignition switch 3 is turned on by a driver's operation, the electric power is supplied from lead storage battery 2 to starter 4 through power supply line L1, to start starter 4. Alternator 5 generates power by rotating energy of a crankshaft of the engine. The power which is generated by alternator 5, is supplied to lead storage battery 2 and/or power supply system 1 through power supply line L1.

Electric equipment 6 is a general term which explains many kinds of electric loads (auxiliary machine) incorporated in the vehicle, for example, a headlight, a power steering, an oil pump, a car navigation system, an audio, or the like. Here, starter 4 and alternator 5 are illustrated, apart from electric equipment 6, for convenience of explanation in this specification. Electric equipment 6 is driven or activated with the power supplied through power supply line L1 from lead storage battery 2 and/or power supply system 1.

Lead storage battery 2 is a main battery which stores electric power generated by alternator 5 and supplies power to starter 4 and electric equipment 6. Power supply system 1 includes nickel hydride storage battery 10, management device 20, first switch SW1, shunt resistor R1, and thermistor T1. Nickel hydride storage battery 10 is a sub-battery which stores electric power generated by alternator 5 and supplies power to electric equipment 6. The capacity of nickel hydride storage battery 10 is designed to be smaller than a capacity of lead storage battery 2. Lead storage battery 2 and nickel hydride storage battery 10 are connected in series.

Lead storage battery 2 has merits that it is comparatively inexpensive, it is capable of operating in the range of comparatively wide temperature, and it has high output. Then, lead storage battery 2 has been widely spread as a vehicular storage battery. However, lead storage battery 2 has demerits that its energy efficiency of charging and discharging is low, it is weak in over-discharge, and its cycle life is short. Nickel hydride storage battery 10 has merits that its energy efficiency of charging and discharging is comparatively high, it is strong in over-charge and over-discharge, its range of usage temperature is wide, its range of SOC (State Of Charge) is wide, and its cycle life is comparatively long.

Here, instead of nickel hydride storage battery 10, a lithium ion storage battery may be used. In the lithium ion storage battery, its energy density is high, its energy efficiency of charging and discharging is high, and it is a storage battery of a high performance. However, it is necessary to strictly manage voltage and temperature. Further, instead of nickel hydride storage battery 10, a capacitor, such as an electric double layer capacitor, or a lithium-ion capacitor, may be used.

The positive electrode of nickel hydride storage battery 10 is connected to power supply line L1 through first switch SW1, and the negative electrode of nickel hydride storage battery 10 is connected to the ground. As first switch SW1, a relay or a semiconductor switch (for example, MOSFET (Metal-Oxide-Semiconductor Field-Effect Transistor), IGBT (Insulated Gate Bipolar Transistor)), can be used. Shunt resistor R1 is inserted at a current path connected to the negative electrode of nickel hydride storage battery 10. Here, shunt resistor R1 may be inserted at the positive electrode side. Thermistor T1 is disposed in the vicinity of nickel hydride storage battery 10.

Figure 2:
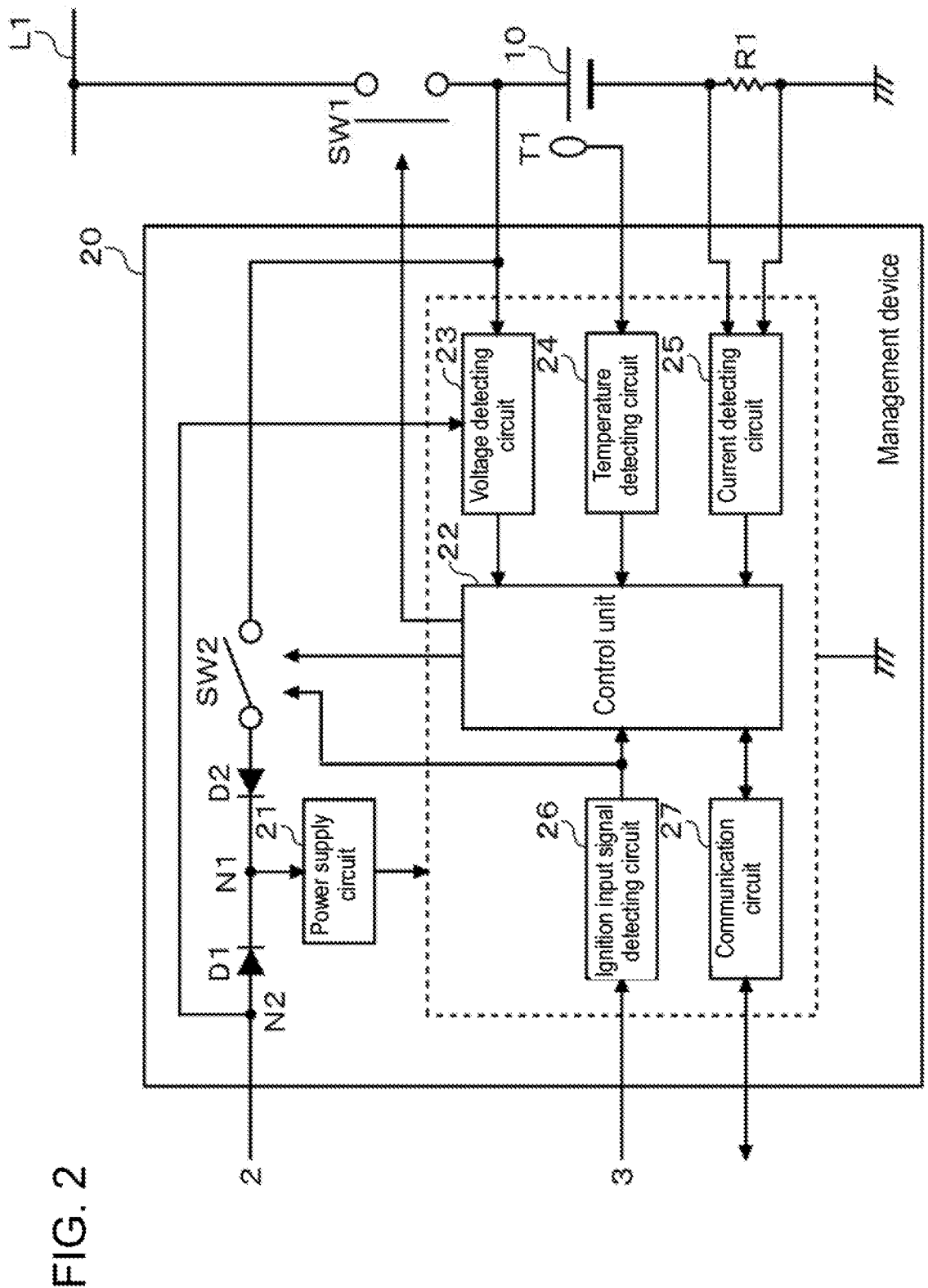
FIG. 2 is a view showing a detailed structure of a management device of FIG. 1.

FIG. 2 is a view showing a detailed structure of management device 20 of FIG. 1. Management device 20 includes power supply circuit 21, control unit 22, voltage detecting circuit 23, temperature detecting circuit 24, current detecting circuit 25, ignition input signal detecting circuit 26, communication circuit 27, first diode D1, and second diode D2. In this exemplary embodiment, these are installed at one control circuit board.

Voltage detecting circuit 23 detects and a voltage of nickel hydride storage battery 10, and outputs to control unit 22. Voltage detecting circuit 23 is configured of, for example, an amplifier, an AD converter. Temperature detecting circuit 24 is connected to thermistor T1, detects a temperature of nickel hydride storage battery 10 based on an output value of thermistor T1, and outputs to control unit 22. Temperature detecting circuit 24 is configured of, for example, voltage dividing resistors, an amplifier, an AD converter. Current detecting circuit 25 detects a current of nickel hydride storage battery 10 based on both-end voltages of shunt resistor R1, and outputs to control unit 22. Current detecting circuit 25 is configured of, for example, an amplifier, an AD converter.

Ignition input signal detecting circuit 26 detects an ignition input signal which indicates a state (ignition state) of ignition switch 3, and output to control unit 22. Communication circuit 27 carries out a communication processing which connects to a communication network (for example, CAN (Controller Area Network)) in the vehicle.

Control unit 22 monitors the state of nickel hydride storage battery 10, and controls charging and discharging of nickel hydride storage battery 10. Control unit 22 is configured of, for example, a CPU. Control unit 22 monitors the state of nickel hydride storage battery 10, based on a voltage, a temperature, and a current inputted from voltage detecting circuit 23, temperature detecting circuit 24, and current detecting circuit 25. For example, managements of SOC (State Of Charge) and SOH (State Of Health) of nickel hydride storage battery 10, are carried out based on a voltage, a temperature, and a current. Further, when an overvoltage, an undervoltage, a high temperature abnormality, a low temperature abnormality, or an overcurrent is detected, control unit 22 turns off first switch SW1, to stop charging and discharging. control unit 22 exchanges many kinds of information with many kinds of ECU (Electronic Control Unit) in the vehicle through communication circuit 27.

Power supply circuit 21 steps down a voltage supplied from lead storage battery 2 which is disposed outside power supply system 1. The stepped-down voltage is supplied to control unit 22, voltage detecting circuit 23, temperature detecting circuit 24, current detecting circuit 25, ignition input signal detecting circuit 26, and communication circuit 27, respectively as a power source voltage. Power supply circuit 21 is configured of, for example, a switching regulator, and 12 V supplied from lead storage battery 2 is stepped down to 3 to 5 V.

In this exemplary embodiment, power supply circuit 21 can receive a power supply, also from nickel hydride storage battery 10 which is disposed inside power supply system 1. Second switch SW2 is a switch that electrically connects or disconnects nickel hydride storage battery 10 to or from power supply circuit 21. A relay or a semiconductor switch (for example, a MOSFET, an IGBT), can be used as second switch SW2.

First diode D1 is inserted between lead storage battery 2 and the power supply circuit 21 in a direction where an anode of first diode D1 is disposed at lead storage battery 2 side and a cathode of first diode D1 is disposed at power supply circuit 21 side. Second diode D2 is inserted between second switch SW2 and first connecting point N1 between a cathode terminal of first diode D1 and power supply circuit 21, in a direction where an anode of second diode D2 is disposed at second switch SW2 side and a cathode of second diode D2 is disposed at connecting point N1 side.

Voltage detecting circuit 23 detects, as the voltage of lead storage battery 2, a voltage of second connecting point N2 between lead storage battery 2 and first diode D1, to output to control unit 22. Here, when the voltage of the cathode side of first diode D1 is detected, in a state where power is supplied from nickel hydride storage battery 10 to power supply circuit 21, the voltage of lead storage battery 2 cannot be detected correctly.

In the above-mentioned circuit configuration, second switch SW2 is controlled by the ignition input signal. Concretely, second switch SW2 is controlled to be ON when the ignition input signal is ON, but second switch SW2 is controlled to be OFF when the ignition input signal is OFF (fundamental control of second switch SW2).

Further, second switch SW2 is controlled by a signal from control unit 22. When the voltage of lead storage battery 2 inputted from voltage detecting circuit 23 becomes under a lower limit voltage (for example, 8V), control unit 22 controls second switch SW2 to be ON.

FIG. 3 is a view (table) showing the on/off states of second switch SW2. When the ignition input signal is ON, regardless of the voltage of lead storage battery 2, second switch SW2 is controlled to be ON. When the ignition input signal is OFF, in a case where the voltage of lead storage battery 2 is normal, second switch SW2 is controlled to be OFF. When the ignition input signal is OFF, in a case where the voltage of lead storage battery 2 is under the lower limit voltage, second switch SW2 is controlled to be ON.

As explained above, according to this exemplary embodiment, even when lead storage battery 2 is in a failure or not available, by the power supply from nickel hydride storage battery 10, monitoring of nickel hydride storage battery 10 and controlling of first switch SW1 can continue. Therefore, even when lead storage battery 2 is in a failure or not available, by controlling first switch SW1 to be ON, the power supply from nickel hydride storage battery 10 to electric equipment 6 can be carried out. Conventionally, when lead storage battery 2 is in a failure or not available, monitoring of nickel hydride storage battery 10 and controlling of first switch SW1 are stopped, and the power supply cannot be carried out, to electric equipment 6 from nickel hydride storage battery 10 where the capacity remains. According to this exemplary embodiment, the capacity of nickel hydride storage battery 10 can be used effectively, compared with the conventional example.

The power supply from nickel hydride storage battery 10 to power supply circuit 21 is cut off while the ignition input signal is OFF. Therefore, the capacity of nickel hydride storage battery 10 can be smaller than the capacity of lead storage battery 2. On the contrary to this, in a case where the power supply from nickel hydride storage battery 10 to power supply circuit 21 continues while the ignition input signal is OFF, in order to prevent a decrease of a remaining capacity of nickel hydride storage battery 10, it is necessary to make the capacities of nickel hydride storage battery 10 and lead storage battery 2 roughly equal.

When lead storage battery 2 is in a failure or not available, the power supply from lead storage battery 2 to ignition switch 3 is stopped. When lead storage battery 2 is in a failure or not available during driving of the vehicle, it is necessary that the power supply from nickel hydride storage battery 10 to power supply circuit 21 continues even in a state where the ignition input signal is OFF. Therefore, when the ignition input signal is changed from ON to OFF, in a case where the voltage of lead storage battery 2 is under a lower limit voltage, control unit 22 determines that lead storage battery 2 is in a failure or not available, and control unit 22 maintains second switch SW2 in the ON state until a SOC of nickel hydride storage battery 10 reaches a lower limit voltage. Thereby, even when lead storage battery 2 is in a failure or not available during driving of the vehicle, the vehicle can be moved to a car dealer or a repair shop by self-traveling.

Further, within management device 20, lead storage battery 2 and nickel hydride storage battery 10 is directly connected, first diode D1 and second diode D2 are inserted in reverse directions. Thus, a large circulation current flowing within management device 20, can be prevented. In a case where first diode D1 and second diode D2 are not inserted, there is a possibility that a large current flows via power supply line L1 and a power supplying line within management device 20, between lead storage battery 2 and nickel hydride storage battery 10, in a transient state of first diode D1 or second diode D2.

The present invention has been described based on the exemplary embodiment. The person of the ordinary skill in the art can understand that the exemplary embodiment is illustrative, combinations of these constitution elements and combined processes can be modified, and such modified examples fall within the scope of the present invention.

For example, within management device 20, two of a power supply circuit for lead storage battery 2 and a power supply circuit for nickel hydride storage battery 10 may be provided. In this case, without providing first diode D1 and second diode D2, lead storage battery 2 and nickel hydride storage battery 10 can be completely separated within management device 20.

In the above-mentioned exemplary embodiment, the lead storage battery is used as the main battery, but the nickel hydride storage battery or the lithium ion storage battery may be used as the main battery.

The exemplary embodiment may be specified by items described below.

[Item 1]
A management device (20) for managing a second power storage device (10) that reinforces a first power storage device for supplying electricity to loads in a vehicle, includes:
  a power supply unit (21) that steps down a voltage supplied from the first power storage device (2);
  a control unit (22) that uses, as a power supply voltage, the voltage generated by the power supply unit (21) and monitors a state of the second power storage device (10) to control charging and discharging of the second power storage device (10); and
  a switch (SW2) that electrically connects or disconnects the second power storage device (10) to or from the power supply unit (21).

According to this, the power supply from the second power storage device (10) to the power supply unit (21) can be carried out depending on the need, and the second power storage device (10) can be effectively used.

[Item 2]
In the management device (20) according to item 1,
  the switch (SW2) is turned on when an ignition state is in an on-state, and is turned off when the ignition is in an off-state.

According to this, during a stop of the vehicle, the remaining capacity of the second power storage device (10) can be prevented from being consumed by the management device (20).

[Item 3]
In the management device (20) according to item 1,
  further the management device (20) includes a voltage detector (23) that detects and outputs a voltage of the first power storage device (2) to the control unit (22), and
  when the ignition state is changed from the on-state to the off-state and a voltage of the first power storage device (2) is under a lower limit voltage, the control unit (22) controls the switch (SW2) to be held in an on-state.

According to this, when the first power storage device (2) is in a failure or not available, the power supply from the second power storage device (10) to the management device (20) can continue.

[Item 4]
In the management device (20) according to any one of items 1 to 3,
  the first power storage device (2) and the second power storage device (10) are connected in parallel, and
  further the management device (20) includes:
  a first diode (D1) that is inserted between the first power storage device (2) and the power supply unit (21) in a direction where a cathode of the first diode (D1) is disposed at the power supply unit (21) side; and
  a second diode (D2) that is inserted between the switch (SW2) and a connecting point (N1) between a cathode terminal of the first diode (D1) and the power supply unit (21), in a direction where a cathode of the second diode (D2) is disposed at the connecting point (N1) side.

According to this, the large circulation current flowing between the first power storage device (2) and the second power storage device (10), can be prevented.

[Item 5]
In the management device (20) according to any one of items 1 to 4,
  the first power storage device (2) is a lead storage batter (2), and the second power storage device (10) is a nickel hydride storage battery (10) or a lithium ion secondary storage battery.

According to this, the lead storage battery (2) can be reinforced by the nickel hydride storage battery (10) or the lithium ion secondary battery.

[Item 6]

A power supply system (1) includes:
- a second power storage device (10) that reinforces a first power storage device (2) for supplying electricity to loads (4, 6) in a vehicle, and
- a management device (20) according to any one of items 1 to 5, that manages the second power storage device (10).

According to this, the power supply from the second power storage device (10) to the power supply unit (21) can be carried out depending on the need, and the power supply system (10) where the second power storage device (10) can be effectively used, can be established.

The invention claimed is:

1. A power supply system comprising:
   a management device for managing a second power storage device that reinforces a first power storage device for supplying electricity to loads in a vehicle,
   a first switch that controls a power supply from the second storage device to the loads in the vehicle,
   wherein the first power storage device and the second power storage device are connected in parallel,
   the management device including:
   a power supply unit that steps down a voltage supplied from the first power storage device;
   a control unit that uses, as a power supply voltage, the voltage generated by the power supply unit and monitors a state of the second power storage device to control charging and discharging of the second power storage device; and
   a second switch that electrically connects or disconnects the second power storage device to or from the power supply unit, wherein a first diode that is inserted between the first power storage device and the power supply unit in a direction where a cathode of the first diode is disposed at the power supply unit side; and
   a second diode that is inserted between the second switch and a connecting point between a cathode terminal of the first diode and the power supply unit, in a direction where a cathode of the second diode is disposed at the connecting point side, and
   an anode of the second diode is connected to a connection point between the second storage device and the first switch.

2. The power supply system according to claim 1, wherein the second switch is turned on when an ignition state is in an on-state, and is turned off when the ignition is in an off-state.

3. The power supply system according to claim 2, further comprising a voltage detector that detects and outputs a voltage of the first power storage device to the control unit, wherein when the ignition state is changed from the on-state to the off-state and a voltage of the first power storage device is under a lower limit voltage, the control unit controls the second switch to be held in an on-state.

4. The power supply system according to claim 1, wherein the first power storage device is a lead storage battery, and the second power storage device is a nickel hydride storage battery or a lithium ion secondary storage battery.

* * * * *